(12) United States Patent
Patrick et al.

(10) Patent No.: US 6,249,623 B1
(45) Date of Patent: Jun. 19, 2001

(54) TEMPERATURE STABILIZED BROADBAND OPTICAL SOURCE AND METHOD OF USING SAME

(75) Inventors: Heather J. Patrick, Silver Spring, MD (US); Alan D. Kersey, South Glastonbury, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/184,465

(22) Filed: Oct. 26, 1998

(51) Int. Cl.[7] .................................................. G02B 6/26
(52) U.S. Cl. .................... 385/37; 385/15; 372/6
(58) Field of Search ................................ 385/15, 27, 37, 385/39; 372/6

(56) References Cited

U.S. PATENT DOCUMENTS

| | | | |
|---|---|---|---|
| 4,938,556 | * | 7/1990 | Digonnet et al. ..................... 359/341 |
| 5,185,749 | * | 2/1993 | Kalman et al. ........................... 372/6 |
| 5,430,817 | * | 7/1995 | Vengsarkar ............................. 385/37 |

* cited by examiner

*Primary Examiner*—Rodney Bovernick
*Assistant Examiner*—Sarah Song
(74) *Attorney, Agent, or Firm*—John J. Karasek; Lawrence G. Legg

(57) ABSTRACT

A method and apparatus for correcting changes in the mean wavelength of a broadband optical source due to changes in temperature. An optical filter is placed so as to filter the output of source, the filter being selected so that, as a function of temperature, its center wavelength changes as fast or faster than the wavelength centroid of the source.

7 Claims, 3 Drawing Sheets

TEMPERATURE STABILIZED BROADBAND OPTICAL SOURCE AND METHOD OF USING SAME

BACKGROUND OF THE INVENTION

Broadband optical sources have a wide variety of applications. However, the usefulness of any such source diminishes if its output spectrum changes with temperature. An example of an application prejudiced by temperature-induced wavelength drift is that of interferometric fiber optic gyroscopes, in which a change in mean wavelength changes the gyroscope's scaling factor. Although superfluroescent fiber-optical sources, most notably erbium doped superfluorescent fibers, have generally good wavelength stability, and are thus widely used in such gyroscopes, they are not immune from temperature-induced wavelength drift.

SUMMARY OF THE INVENTION

Accordingly, an object of the invention is to compensate for temperature-induced changes in the mean wavelength of broadband optical sources.

Another object is to do the foregoing in optical sources useful with interferometric fiber optic gyroscopes.

Another object is to do the foregoing in actively doped optical fibers.

Another object is to do the foregoing in erbium doped superfluorescent optical fibers.

In accordance with these and other objects made apparent hereinafter, the invention concerns a optical system and method employing an optical source and an optical filter. The source's output has a wavelength centroid which changes with increasing temperature within a temperature range of interest. The filter is selected so that the wavelength specific magnitude of the rate of change with temperature of its center wavelength is greater than or equal to the wavelength specific magnitude of the rate of change with temperature of the source's wavelength centroid within the temperature range of interest. In so doing, the change in mean wavelength of the source due to temperature increase is offset by the change in mean wavelength of the filter.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
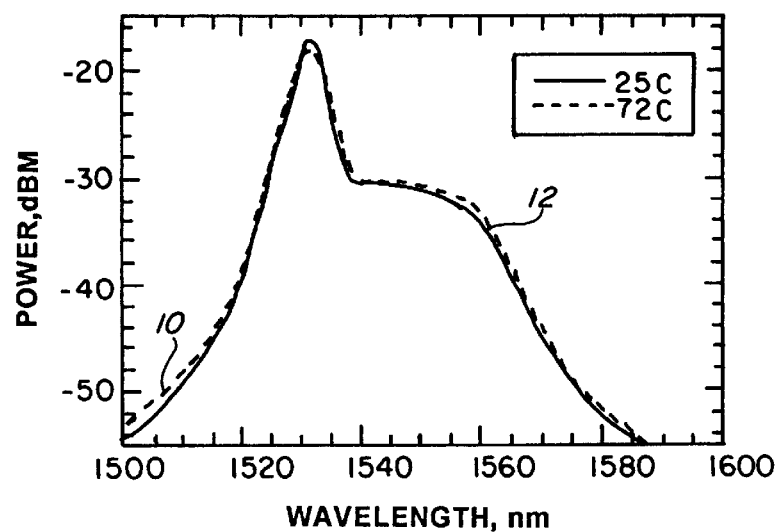
FIG. 1 is a graph illustrating power spectral density of an actively doped optical fiber.

With reference to the drawing figures, wherein like numbers indicate like parts throughout the several views, FIG. 1 shows the spectral density of an optical source, here the power density of a particular erbium doped superfluorescent fiber generated by testing the fiber in the laboratory, which is discussed in more detail in the Example, below. The solid curve in FIG. 1 is the fiber's spectrum at 25° C., the dotted curve is the spectrum at 72° C. From it, one can see that increased temperature increases output power at the short wavelength and long wavelength end of the spectrum (reference numbers 10 and 12, respectively). The mean wavelength $\lambda_\mu$ of the spectrum is given by:

$$\lambda_\mu = \{\Sigma_i [\lambda_i P(\lambda_i)]\} / \{\Sigma_i [P(\lambda_i)]\}$$

where i is an index for the wavelengths present in the spectrum, and $P(\lambda_i)$ is the magnitude of the spectral density for the ith wavelength in the source's spectrum. This is also the formula for the centroid of $P(\lambda)$ about the $\lambda$ axis, and thus may be called the wavelength centroid, as well as the mean wavelength. Increases 10, 12 in the power density of FIG. 1 are disposed on opposite sides of what one would expect to be the mean wavelength of the density function, excursion 10 occurs at a low power portion of the curve, whereas excursion 12 occurs at the higher power end of the curve, and thus excursion 12 causes significantly more change in the wavelength centroid. In other words, the optical fiber whose response FIG. 1 shows will have an increasing mean wavelength $\lambda_\mu$ with increasing temperature. For the same reason, one can see by comparison of FIG. 1 and the above equation that filtering out a portion of the power density towards its long wavelength end will reduce the wavelength centroid. From this, it follows that any optical filter which has a temperature dependent center frequency within the bandwidth of optical fiber (about 1500 to 1600 nm in FIG. 1), and whose wavelength specific center frequency increases at a rate matches or exceeds the temperature-induced increase in the wavelength centroid of the fiber will offset to some useful degree the shift in mean wavelength.

Figure 2:
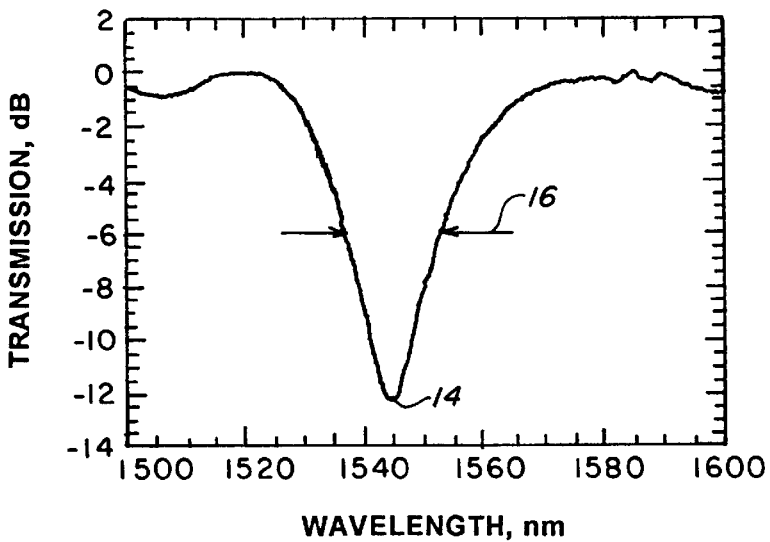
FIG. 2 is a graph of the spectral response of an optical grating.
Figure 3:
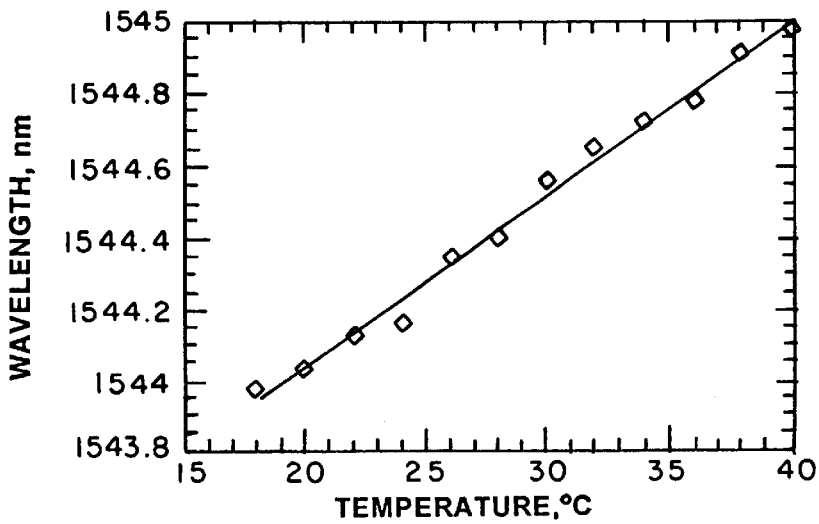
FIG. 3 is a graph illustrating the temperature dependence of the spectral response of FIG. 2.

FIGS. 2 and 3 illustrate performance of a long period optical grating, a preferred filter for use with the invention. By long period it is meant that the grating period is large with respect to anticipated system wavelengths such that the grating will reflect substantially no light. FIGS. 2 and 3, like FIG. 1, represent laboratory data taken on a specific grating, the details of which will also be discussed further in the Example below. However, the general form of the graphs in FIGS. 2–3 are generally exemplary for long period optical gratings. As seen in FIG. 2, the wavelength response of the grating within the bandwidth of the source's spectral density is that of a notch filter, with a center frequency 14 at about 1545 nm and a well-defined filter width, illustrated by notch width 16 at full wave half maximum. FIG. 3, a graph of the grating's center wavelength as a function of temperature, illustrates that the center frequency of the grating has a strong, positive going, temperature dependence, which moreover is substantially linear. Long period gratings are preferred filters for the invention because they have low back reflection. Also because the temperature of available gratings are several times larger than commonly used superfluorescent fiber sources (e.g. the erbium doped fiber of FIG. 1), the generally linear relationship between center frequency and temperature, coupled with the general insensitivity of filter widths to temperature, make such gratings relatively easy to design for any given application.

Figure 4:
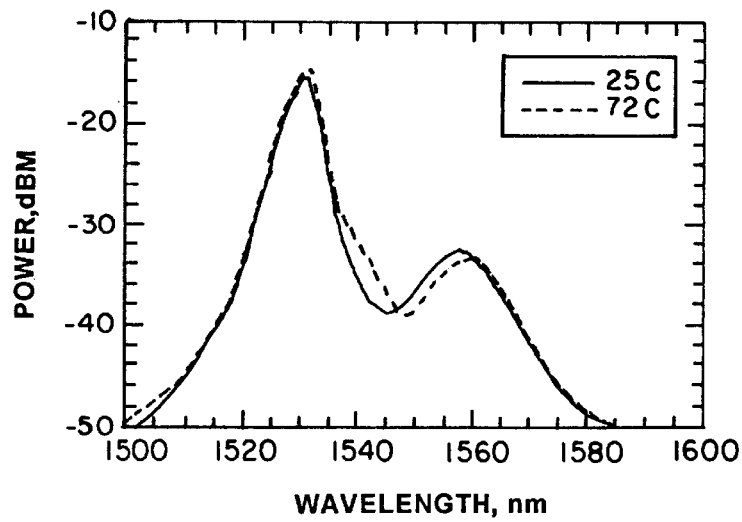
FIG. 4 is a graph illustrating the power spectral density of the optical fiber related to FIG. 1.

FIG. 4 is a graph, also of laboratory data discussed further in the Example, below, of the response of a composite system using the optical fiber whose spectrum is shown in FIG. 1, as filtered by the grating whose response is shown in FIGS. 2–3. Again, the solid line is data taken at 25° C. and the dotted line data taken at 72° C. As expected, the filter cuts a trough 18 out of the fiber's spectrum, reducing the total output of the fiber. However, the trough 22 at the higher temperature is upshifted in wavelength from the trough at 20, cutting out a higher wavelength portion of the power density at the higher temperature, and thus offsetting temperature-induced increase in the mean wavelength of the power density.

Figure 5:
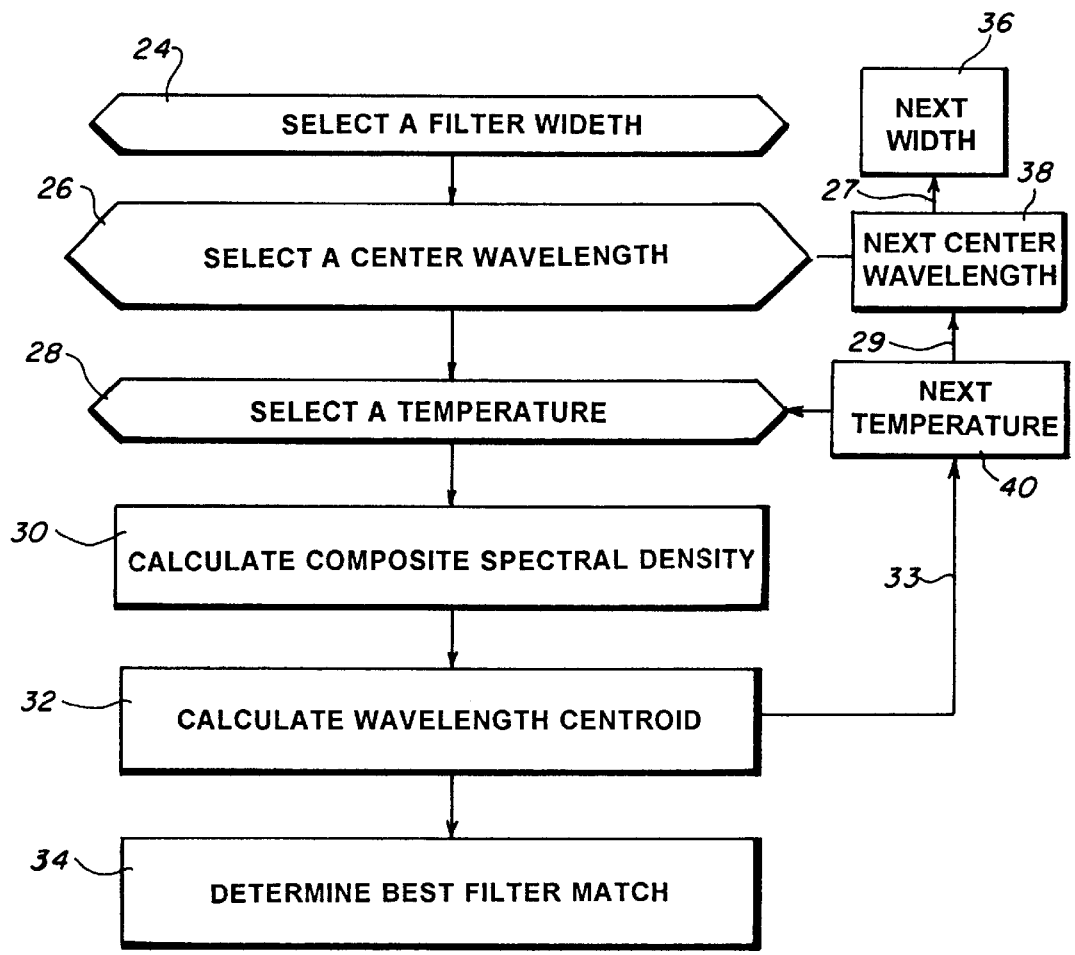
FIG. 5 is a flow chart illustrating a scheme for selecting an optimal filter, according to the invention.

FIG. 5 illustrates a scheme for systematically identifying the best filter for any given application. It is presupposed that one knows a priori the spectral density of the optical source over wavelengths of interest, e.g. by either generating a model, or by laboratory testing of the source. Given these data, one then performs three nested iterations 24, 26, 28 as follows: First select an initial filter width (24) and center wavelength (26), and an initial temperature (28). Using the selected filter parameters and the existing spectral density of the source, calculate the composite spectral density of the source plus filter (30) (i.e. such as is illustrated in FIG. 4). From this, use any known numerical technique to calculate the wavelength centroid (32). Iteratively repeat this over the temperature range of interest (33, 40, 28) to generate set of wavelength centroids, one each of which corresponds to one of the temperatures. Having done so, select a new center wavelength (26, 29, 38) and repeat the temperature iteration again, generating further centroids. Having repeated this for center wavelengths of interest, iteratively repeat the process for filter widths of interest (27, 36, 24).

At the end of this process, one will have generated a number of wavelength centroids corresponding to all combinations of filter width and center wavelength, as a function of varying temperature. One then uses the centroids to determine the pair of filter width and center wavelength which best stabilizes temperature-dependent centroid drift (34). To make this determination, one can use any known technique to test for optimal minimization, and example of which is simply to preselect a nominal value, e.g. corresponding to expected centroid value without filtering, subtract the nominal value from each centroid calculated for each temperature, and sum these differences for all centroids generated for each pair of filter width and center wavelength, i.e. summed over the temperature range of interest. The combination of filter width and center wavelength which produces the smallest sum would then be optimum (34).

Variations within the process of FIG. 5 will, of course, occur to those skilled in the art. For example, iterations 24 and 26 may be employed in reverse order. Moreover, one need not iterate both filter width and center wavelength, if, for example other application specific constraints were to mandate a specific choice of either filter width or center wavelength.

The foregoing describes optical sources and filters whose respective wavelength centroids and center wavelengths increase with temperature. This, however, is merely exemplary. One can as readily practice the invention with sources and filters whose respective centroids and center wavelengths decrease with temperature.

EXAMPLE

Figure 6:
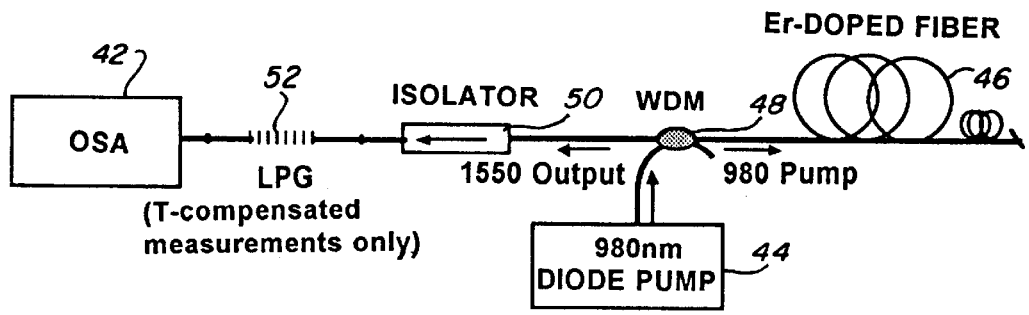
FIG. 6 is a schematic diagram of a system used for proof of principle of the invention.

FIG. 6 shows an experimental apparatus used to demonstrate proof of principle. A laser diode 44 pumps an erbium doped superfluorescent optical fiber 46 with pump light of 980 nm, which fiber 46 converts to light at 1550 nm. Wavelength division multiplexer 48 directs the pump input to fiber 46 while isolating the remainder of the apparatus from the 980 nm light, and directing the retransmitted 1550 nm light to long period grating 52. Isolator 50 protect against any back reflection in the system, and optical spectrum analyzer 42 generates power from fiber 46.

In the test apparatus, 9.9 m of single-mode fiber was used, doped to 500 ppm of erbium by weight. The end of the fiber 46 was terminated with an angle cleave and several loops of fiber around a mandrel (not shown) to reduce reflection. Pump 44 was a Seastar Optics diode laser operating in single mode, which produced roughly 70 mW of fiber-coupled power. Isolator 50 reduced backreflected 1550 nm light by 55 dB. For measurement of intrinsic temperature dependence of fiber 46, grating 52 was removed.

In characterizing the performance of grating 52, data down to 30 Db below spectrum peak were used. A long period grating was selected because it provides several decades of attenuation in a 10–20 nm band (full width, half maximum). To design the grating with the correct properties for temperature compensation, the effect of removing a 10 to 20 nm wide slice from fiber 46's output spectrum was modeled, with a 0.05 nm/° C. temperature coefficient. In this manner, a center wavelength of between 1540 nm to 1547 nm was found to be ideal. To test this, a long period grating was produced by excimer-laser exposure of an $H_2$-loaded fiber through a 275 µm period dielectric amplitude mask. The resultant grating had a center wavelength of 1545 nm, full wave half maximum width of 20 nm, a length of 2 cm, and 12 dB of maximum attenuation. The transmission spectrum of this grating is shown in FIG. 2. The temperature slope of grating 52 (FIG. 3) was measured at 0.048 nm/C. Because grating 52's spectrum is sensitive to fiber bends, grating 52 was mounted to a quartz microscope slide under a small amount of tension, and mechanically coupled to the output of fiber 46 on the 1550 nm side of coupler 48.

Figure 7:
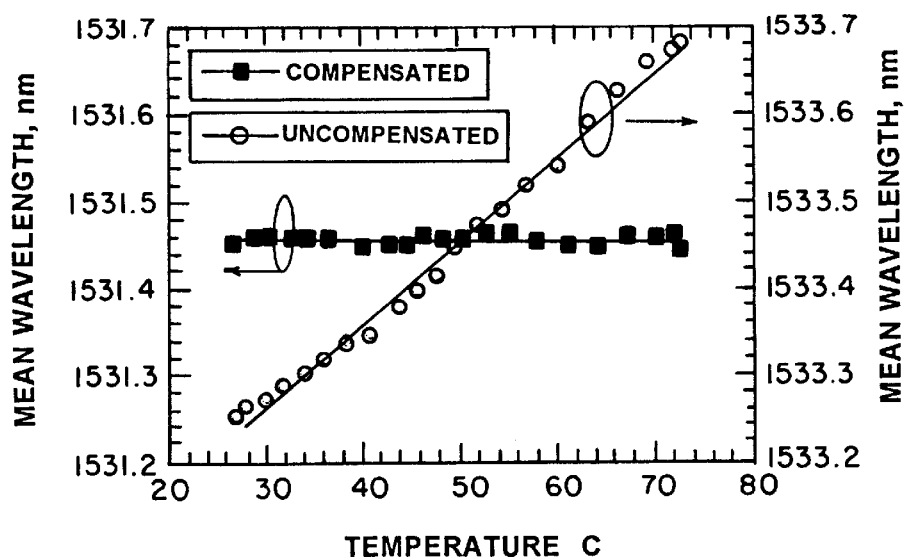
FIG. 7 is a graph of data generated by the system of FIG. 6.

To measure intrinsic temperature dependence of fiber 46, the fiber was placed in an oven and heated to 72° C. The oven was then turned off and the mean wavelength periodically measured as the fiber cooled. Laser pump 44, coupler 48, and isolator 50 were held at room temperature during the measurement. FIG. 4 represents these data at two temperatures, 25° C. and 72° C. These data are presented in FIG. 7, in which, open circle points represent wavelength centroid of fiber 46 without filter 52, and black square points represent wavelength centroid as compensated by filter grating 52. The data of FIG. 7 shows a linear increase of the centroid with temperature for the uncompensated fiber, but a virtually flat response for the compensated fiber across the temperature range tested, about 25° C. to 72° C.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

What is claimed is:

1. A method, said method using:

an optical source with an output bandwidth of interest, the wavelength centroid of said bandwidth changing with increasing temperature within a temperature range of interest;

an optical filter whose center wavelength lies within said bandwidth of interest for temperatures within said temperature range of interest; and wherein the absolute value of the wavelength specific magnitude of the rate of change of said center wavelength of said filter is greater than or equal to the absolute value of the magnitude of the wavelength specific rate of change of said wavelength centroid within said bandwidth of interest and within said temperature range of interest;

wherein said method comprises:
generating a plurality of spectral densities of said source for a corresponding plurality of temperatures within said temperature range;
selecting a filter width of said filter;
selecting a center frequency of said filter;
said method further comprising:
  a. determining the resultant spectral density of said source as filtered by said filter;
  b. determining the wavelength centroid of said resultant spectral density;
  c. determining the difference between said wavelength centroid of said resultant spectral density and a preselected reference, said reference being denominated the centroid excursion;
repeating steps (a) through (c) to produce a plurality of centroid excursions, for either:
  (1) a plurality of center wavelengths from among a preselected number of wavelengths within said bandwidth of interest; or
  (2) a plurality of filter widths from among a preselected number of filter widths.

2. The method of claim 1, wherein said repeating is done for both of said plurality of center wavelengths and for said plurality of filter widths.

3. The method of claim 1, further comprising identifying the one of said plurality of center wavelengths and the one of said plurality of filter widths which produced the smallest of said centroid differences.

4. The method of claim 2, further comprising identifying the one of said plurality of center wavelengths and the one of said plurality of filter widths which produce the smallest of said centroid differences.

5. An optical apparatus comprising:
an optical source with an output bandwidth of interest, the wavelength centroid of said bandwidth changing with increasing temperature within a temperature range of interest;
an optical filter whose center wavelength lies within said bandwidth of interest for temperatures within said temperature range of interest; and
wherein the absolute value of the magnitude of the wavelength specific rate of change of said center wavelength of said filter is greater than or equal to the absolute value of the magnitude of the wavelength specific rate of change with temperature of said wavelength centroid within said bandwidth of interest and within said temperature range of interest;

said apparatus further comprising:
means for generating a plurality of spectral densities of said source for a corresponding plurality of temperatures within said temperature range;
means for selecting a filter width of said filter;
means for selecting a center frequency of said filter;
said apparatus further comprising:
means for determining the resultant spectral density of said source as filtered by said filter;
means for determining the wavelength centroid of said resultant spectral density;
means for determining the difference between said wavelength centroid of said resultant spectral density and a preselected reference, said reference being denominated the centroid excursion.

6. The apparatus of claim 5, wherein said apparatus is adapted to:
produce a plurality of centroid excursions corresponding to a plurality of pairs of center wavelengths of said filter and a plurality of widths of said filter; and
determine which of said pairs produce the smallest of said centroid differences.

7. An optical method comprising:
providing an optical source with an output bandwidth of interest, the wavelength centroid of said bandwidth changing with temperature within a temperature range of interest;
selecting an optical filter, wherein the center wavelength of said filter lies within said bandwidth of interest for temperatures within said temperature range of interest;
the absolute value of the magnitude of the wavelength specific rate of increase of said center wavelength of said filter is greater than or equal to the absolute value of the magnitude of the wavelength specific rate of change of said wavelength centroid within said bandwidth of interest and within said temperature range of interest; and
said method further comprising the steps of:
  (a) disposing said filter to filter the output of said optical source;
  (b) identifying a plurality of center wavelengths from among a preselected number of wavelengths within said bandwidth of interest or a plurality of filter widths from among a preselected number of filter widths;
  (c) producing a plurality of centroid excursions corresponding to said plurality of center wavelengths and said plurality of filter widths; and
  (d) identifying the one of said plurality of center wavelengths and the one of said plurality of filter widths which produce the smallest of differences in centroid excursions.

* * * * *